United States Patent
Regev et al.

(10) Patent No.: US 7,280,549 B2
(45) Date of Patent: Oct. 9, 2007

(54) HIGH SPEED RING/BUS

(75) Inventors: Zvi Regev, West Hills, CA (US); Alon Regev, Woodland Hills, CA (US)

(73) Assignee: Micron Technology, Inc., Boise, ID (US)

(*) Notice: Subject to any disclaimer, the term of this patent is extended or adjusted under 35 U.S.C. 154(b) by 1095 days.

(21) Appl. No.: 10/190,554

(22) Filed: Jul. 9, 2002

(65) Prior Publication Data

US 2003/0031209 A1 Feb. 13, 2003

Related U.S. Application Data

(60) Provisional application No. 60/303,719, filed on Jul. 9, 2001.

(51) Int. Cl.
*H04L 12/28* (2006.01)
*H04J 3/06* (2006.01)

(52) U.S. Cl. ........................ 370/404; 370/509
(58) Field of Classification Search ........... None
See application file for complete search history.

(56) References Cited

U.S. PATENT DOCUMENTS

| | | | | |
|---|---|---|---|---|
| 4,661,952 A | * | 4/1987 | von Sichart et al. | 370/460 |
| 4,845,709 A | * | 7/1989 | Matsumoto et al. | 370/452 |
| 5,119,373 A | * | 6/1992 | Fredricsson et al. | 370/458 |
| 5,249,201 A | | 9/1993 | Posner et al. | |
| 5,301,185 A | * | 4/1994 | Cherry | 370/216 |
| 5,440,557 A | * | 8/1995 | Brief | 370/403 |
| 5,469,166 A | | 11/1995 | Regev | |
| 5,778,188 A | * | 7/1998 | Taniguchi et al. | 709/236 |
| 5,841,974 A | * | 11/1998 | Krone et al. | 709/201 |
| 6,377,998 B2 | * | 4/2002 | Noll et al. | 709/236 |
| 6,747,985 B1 | * | 6/2004 | Lovette | 370/460 |

* cited by examiner

*Primary Examiner*—Andrew C. Lee
(74) *Attorney, Agent, or Firm*—Dickstein Shapiro LLP

(57) ABSTRACT

A data communication bus and method of operation thereof, including a plurality of nodes connected to a respective plurality of media segments. A typical node includes an output port coupled to a media segment that it exclusively controls. And an input port coupled to a media segment that is exclusively controlled by another node of the bus. Each media segment typically includes a plurality of high speed data channels such as electrical transmission lines.

11 Claims, 11 Drawing Sheets

HIGH SPEED RING/BUS

CROSS REFERENCE TO RELATED APPLICATIONS

This patent application claims the benefit of U.S. Provisional Patent Application No. 60/303,719, filed Jul. 9, 2001, the disclosure of which is herewith incorporated in its entirety.

FIELD OF THE INVENTION

The present invention relates generally to data communications systems, and particularly to a high speed data bus architecture.

BACKGROUND OF THE INVENTION

Modern digital and communications and processing systems rely on the rapid communication of digital data between components and subsystems. This communication of digital data has been effected using a wide variety of data bus architectures. Typically, wide parallel bus architectures have been used for short-distance communications of high-speed data, as in digital processors and system back planes. Where data is to be communicated over longer distances, serial data bus architectures, such as Ethernet, have proven effective. Busses operating under the control of a master controller are known in the art, as are peer-to-peer networks. There is, however, an opportunity to improve the performance of many systems by the introduction of a superior high-speed data bus architecture.

BRIEF SUMMARY OF THE INVENTION

The present invention provides a high-speed data bus made up of a plurality of local nodes coupled to one another by high speed media segments. Typically the nodes and media segments are configured in a ring structure. Data bearing messages are passed sequentially from node to node along intervening media segments. In one aspect, each media segment is composed of a plurality of parallel transmission line (T-line) channels. In another aspect, data signals are transmitted in serial fashion on the parallel-configured T-line channels, such that signal transit time over a particular media segment is longer than the minimum time between bit transitions. In a further aspect of the invention, incoming and outgoing data is buffered at each node so that a message being received by a node may differ from a message simultaneously being transmitted by the same node. In another aspect, a node according to the invention includes a data synchronizer adapted to perform phase alignment and bit alignment on data signals in parallel T-line channels. In a further aspect, the invention includes a high-speed clock signal used by the data synchronizer to align signals. The high-speed clock signal may be encoded in the transmitted data and extracted therefrom, or may be transmitted on a separate high speed clock signal line. In yet another aspect of the invention each node of a ring/bus is a bus master node with respect to the transmission of data on a media segment coupled to an output of the node. The same node is a slave with respect to the reception of data on a media segment coupled to an input of the node.

The above and other features and advantages of the invention will be more readily understood from the following detailed description of the invention which is provided in connection with the accompanying drawings.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those of ordinary skill in the art to make and use the invention, and it is to be understood that structural, logical or procedural changes may be made to the specific embodiments disclosed without departing from the spirit and scope of the present invention.

Figure 1:
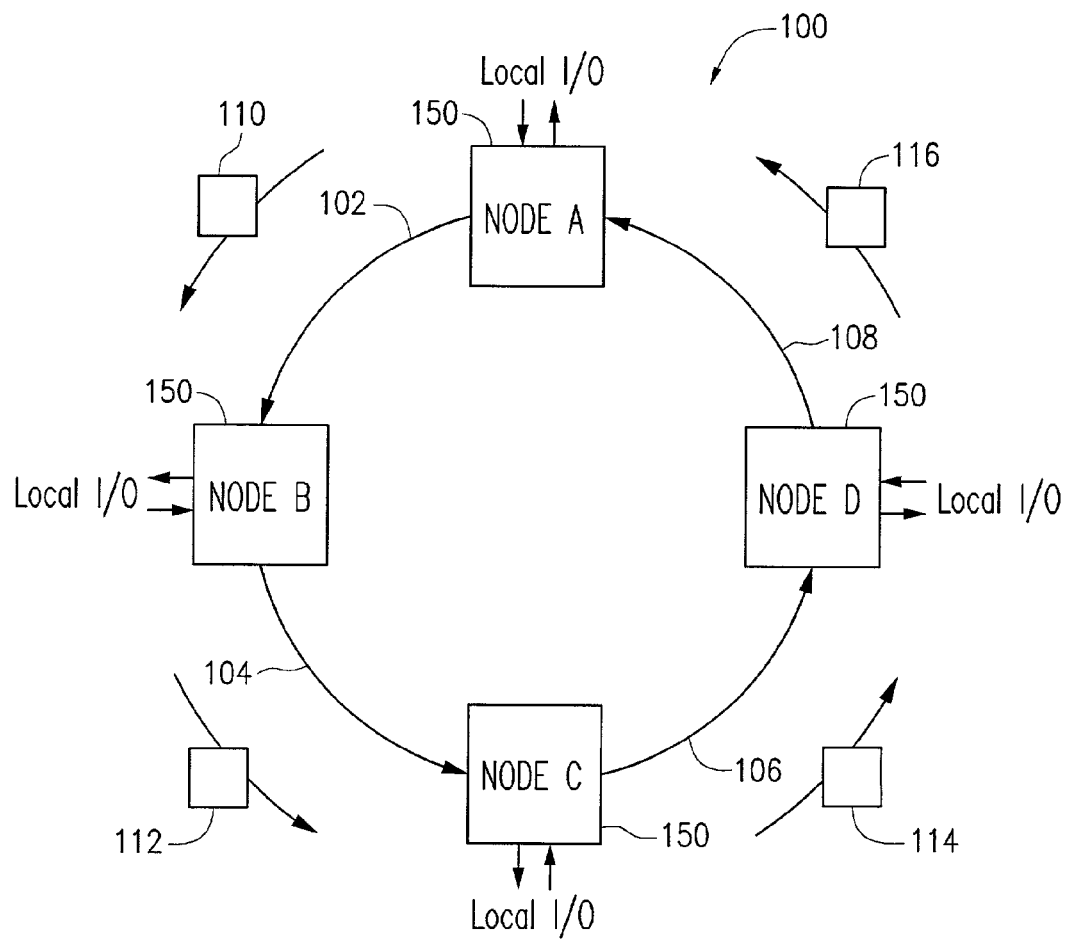
FIG. 1 shows a high speed bus according to one aspect of the invention.

FIG. 1 depicts a simplified block diagram of a high speed data bus system 100, in accordance with an exemplary embodiment of the invention. As shown, four nodes, A, B, C and D are coupled together by four respective media segments 102, 104, 106 and 108. In one aspect of the invention, each of the four nodes embodies similar structure, and provides correspondingly similar function. The nodes operate in a peer-to-peer relationship to one another inasmuch as no one node is a master to the entire bus. Data moves from node to node across the media segments in a single (here counterclockwise) direction. A wide variety of conventions may be employed with respect to data transmission. In the illustrated embodiments, the data is transmitted in discrete packets. Exemplary packets are shown being transmitted in FIG. 1. For example, packet 110 is shown being transmitted from node A to node B, packet 112 is shown being transmitted from node B to node C; packet 114 is shown being transmitted from node C to node D; and packet 116 is shown being transmitted from node D to node A. It should be noted that, according to one aspect of the invention, packets 110, 112, 114 and 116 represent completely different messages transmitted simultaneously over different media segments of the data bus.

Figure 2:
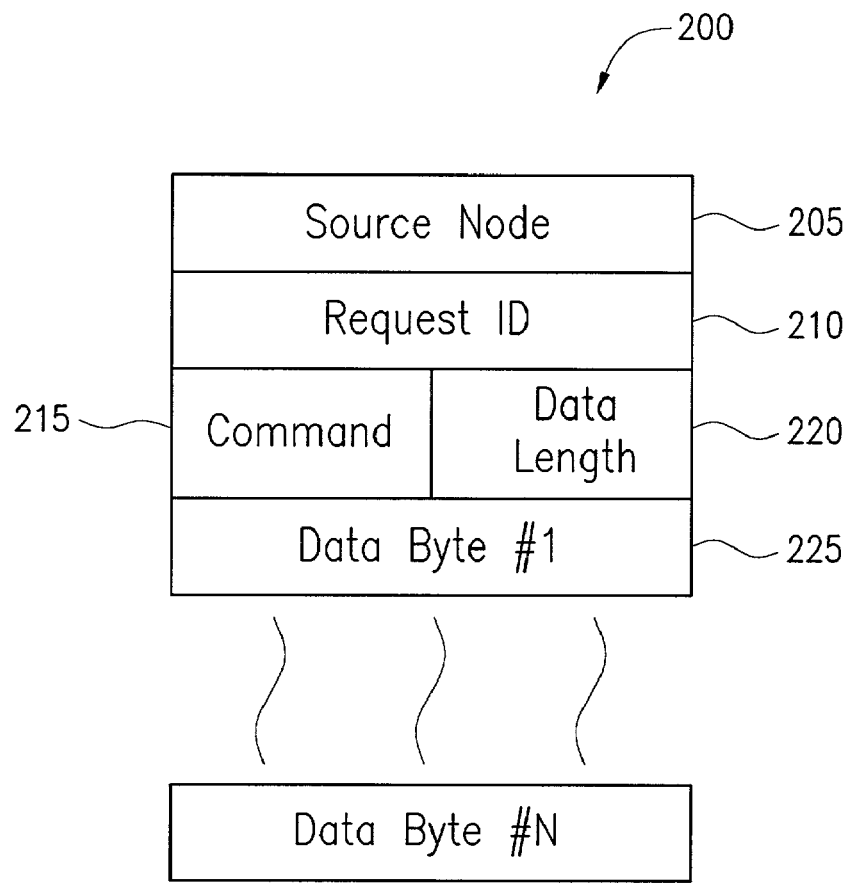
FIG. 2 shows an exemplary data packet structure for transmission on the high speed bus.

FIG. 2 depicts an exemplary packet structure 200 used in the high speed data bus system 100 of FIG. 1. The exemplary packet structure shown is adapted for use in a distributed Content Accessible Memory (CAM) system, as described in co-depending patent Application No. 10/179,383. For purposes of simplicity, the packet structure 200 is depicted as containing five fields. A first field is a source node (or origin) field 205. The source node field 205 identifies the CAM from which the command was originally issued and to which CAM the result must be returned.

A second field of the packet structure 200 is the request identification field 210. The request identification field 210 contains the identification for a particular command originated at a local node. The request identification field 210 is used to associate a command with a response received from one of the CAMs. The response contains the same request identification as the original command. Alternatively, the request identification can be viewed as an identification number of the packet.

The third field of the packet structure 200 is a command field 215. The command contained therein is selected from a command set pre-defined for use in a particular application.

The fourth field of the packet structure 200 is the data length field 220. The data length field 220 indicates the number of data bytes in the packet. The data 225 itself is also included in the packet structure 200 as the fifth field. Generally, the amount of data contained in the packet structure 200 is command and implementation dependent.

Figure 3:
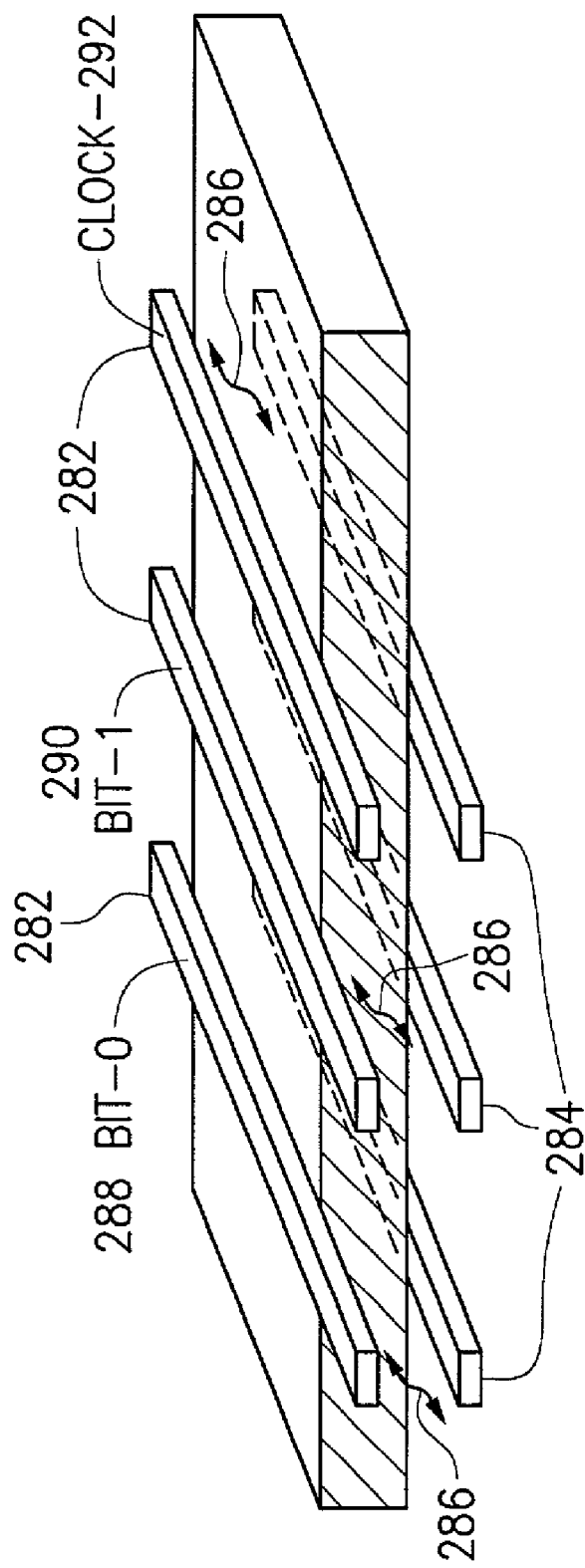
FIG. 3 shows a portion of an exemplary media segment showing three strip-line transmission lines.

FIG. 3 shows a portion of an exemplary media segment, according to one aspect of the invention. The media segment 280 includes three strip-line T-lines, of a form known in the art. Each transmission line includes respective first 282 and second 284 conductors disposed in substantially parallel spaced relation to one another on respective opposite sides of a respective dielectric region 286. The embodiment shown includes two T-lines allocated to the transmission of data (bit-0 288 and bit-1 290) and a third T-line 292 allocated to carry a high speed clock signal. As is discussed in further detail below, the presence of the separate clock line 292 is optional, as is the number of data transmission T-lines. Although the embodiment shown includes strip line conductors, other media such as coaxial cable, microwave wave-guides, optical fibers, coherent free-space transmission, or other media formats known in the art, may be used alone or in combination.

Figure 4:
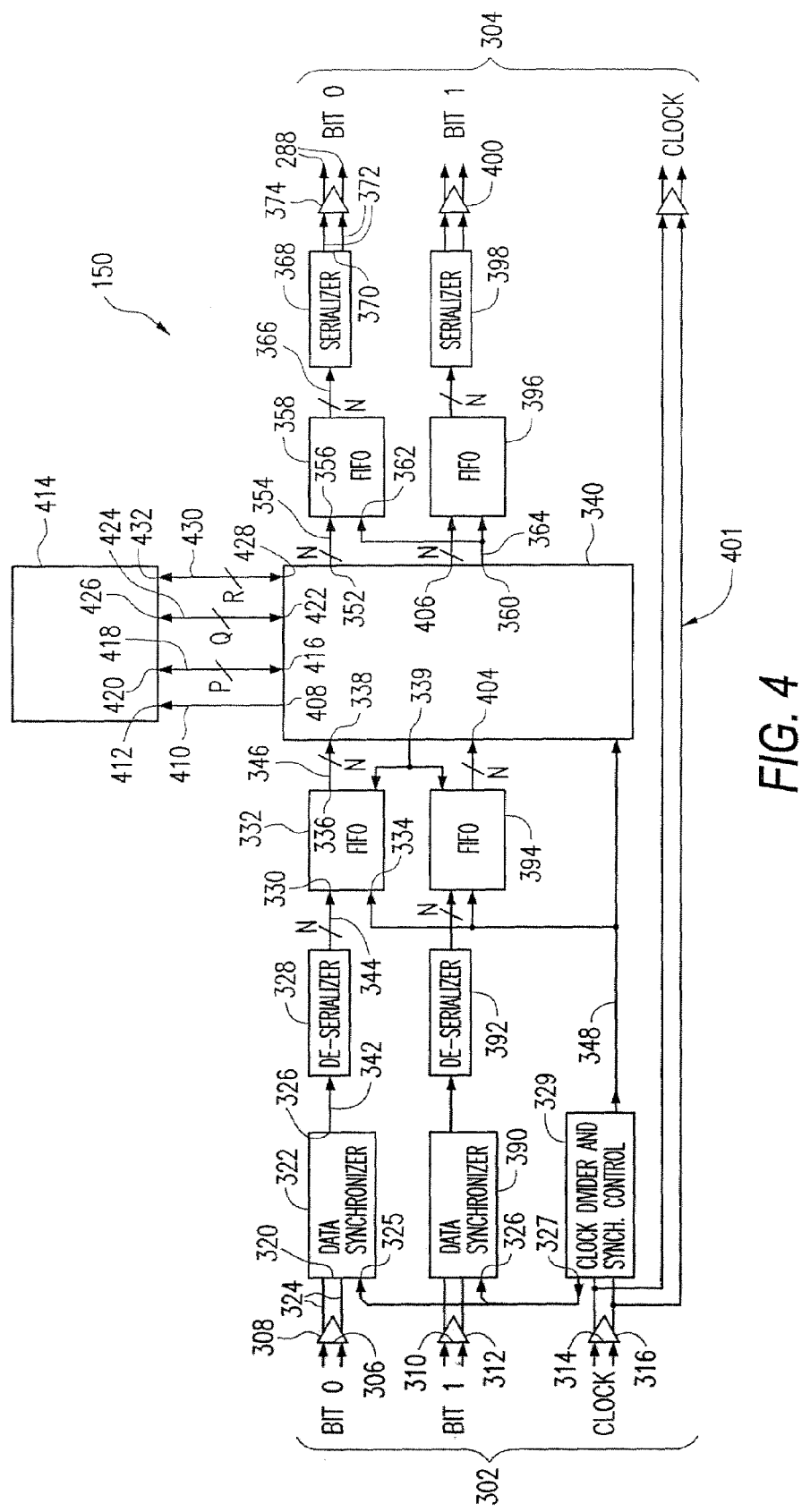
FIG. 4 shows a portion of an exemplary bus node in block-diagram form according to one aspect of the invention.

FIG. 4 shows an exemplary node 150 of a high speed data bus system, in block diagram form. One preferred embodiment of the invention is shown, in which the data path of the high speed media is 2 bits wide (bit 0, bit 1). In other preferred embodiments, the data path is 8, 16 or 32 bits wide. Other data widths may be routinely selected, depending on the technical demands of a particular application.

The node 150 includes an input port 302 and an output port 304. The input port includes a first differential amplifier input 306 of a first input amplifier 308 and a second differential input 310 of a second input amplifier 312. Also, included in the FIG. 4 embodiment is a third differential input 314 of a third input amplifier 316, where the third differential input is adapted to receive a high speed clock signal. Following the bit-0 data path through the node, one sees that the input amplifier 308 is coupled at a differential output to a first input 320 of a data synchronizer circuit 322. In the embodiment shown, this coupling is made by means of a differential signal line 324. The data synchronizer circuit 322 includes a signal input 325 coupled to a clock output 327 of a clock divider and synchronization control circuit 329 for receiving a first clock signal. However, single ended interconnections may be used instead of the differential, everywhere in the node.

The data synchronizer circuit 322 is coupled at an output 326 to an input of a deserializer circuit 328. An output of the deserializer circuit is coupled to a first input 330 of an input FIFO buffer circuit 332. The input FIFO buffer circuit 332 includes a further input 334 adapted to receive a second clock signal, and an output 336 coupled to a first input 338 of a formatter, interface and control (FIC) circuit 340.

The deserializer 328 is a demultiplexer that receives a single bit-wide input from line 342 and outputs a multi-bit-wide output on line 344. Thus, for example, if line 344 is 8-bits wide, 8 bits received in serial fashion at the input of the deserializer are output in parallel as a single 8-bit wide word at the output of the deserializer 328.

In this exemplary case, the input FIFO buffer 332 is 8-bits wide, corresponding to the width of the deserializer 328 output.

As is readily understood, the rate at which data is clocked out of the deserializer is slower than the rate at which it is clocked in by a factor equal to the ratio of output data width to input data width.

In the exemplary embodiment of FIG. 4, the coupling 342 between the data synchronizer circuit 322 and the deserializer circuit 328 is a single-ended signal line. So too, the coupling 344 between the deserializer and the FIFO input buffer and the coupling 346 between the FIFO input buffer and the FIC circuit 340 both include single-ended signal lines. Also, the second clock signal is shown to be conveyed within the node 150 on a single-ended signal line 348. One of skill in the art would routinely select single-ended and differential coupling lines for use within the system according to the demands of a particular application.

A first output 352 of FIC circuit 340 is coupled by a single-ended signal line 354 to a first input 356 of an output FIFO buffer 358. A third clock signal is coupled from a second output 360 of the FIC circuit 340 to a second (clock) input 362 of output FIFO buffer 358 by a single-ended signal line 364. An output of the output FIFO buffer 358 is coupled through a further single-ended signal line 366 to an input of a serializer circuit 368. The serializer circuit includes a differential output 370 coupled through a differential signal line 372 to a differential input of an output amplifier 374. An output of the output amplifier 374 forms a portion of output port 304, and is coupled to a further T-line 288 of a further media segment.

The bit-1 signal path includes a respective input amplifier 312, data synchronizer circuit 390, deserializer circuit 392, FIFO input buffer 394, FIFO output buffer 396, serializer circuit 398, and output amplifier 400, coupled to one another, and to the FIC circuit 340 in the same manner, and operating the same way, as the corresponding components of the bit-0 signal path.

As discussed above, a high speed clock signal is transmitted from node to node around the ring on a high-speed clock signal line 401. In another embodiment of the invention, the high speed clock signal is encoded into the data transmitted from node to node, so that no separate high speed clock signal line is needed. In one aspect of the invention any node on the ring may be arbitrarily selected to originate the clock signal for the ring. In another aspect of the invention, responsibility for clock generation may be passed from node to node depending, for example, on a timed interval. Alternately, the clock signal may originate from a clock circuit that is separate from any node. Also, every node may generate and output its own clock to be used in the ring segment over which the node is the master.

The FIC circuit also includes a data input 404 for receiving input data from the bit-1 data path, a control output 339 for controlling data flow out of the input FIFO buffer, and a data output 406 for outputting data to the bit-1 data path. A clock output 408 outputs a fourth clock signal, generated by the FIC, over a clock line 410 to a clock input 412 of an application circuit 414. In FIG. 4, "P", "Q" and "R" represent data path widths being routinely implemented according to the requirements of a particular application. A control input/output 416 outputs control signals over a P-bit wide control bus 418 data path to a control input/output 420 of the application circuit 414. An address input/output 422 outputs address signals over a Q-bit wide address bus 424 data path to an address input/output 426 of the application circuit 414, and a data input/output 428 of the FIC outputs data signals over an R-bit wide data bus 430 data path to a data input/output 432 of the application circuit 414.

Figure 5:
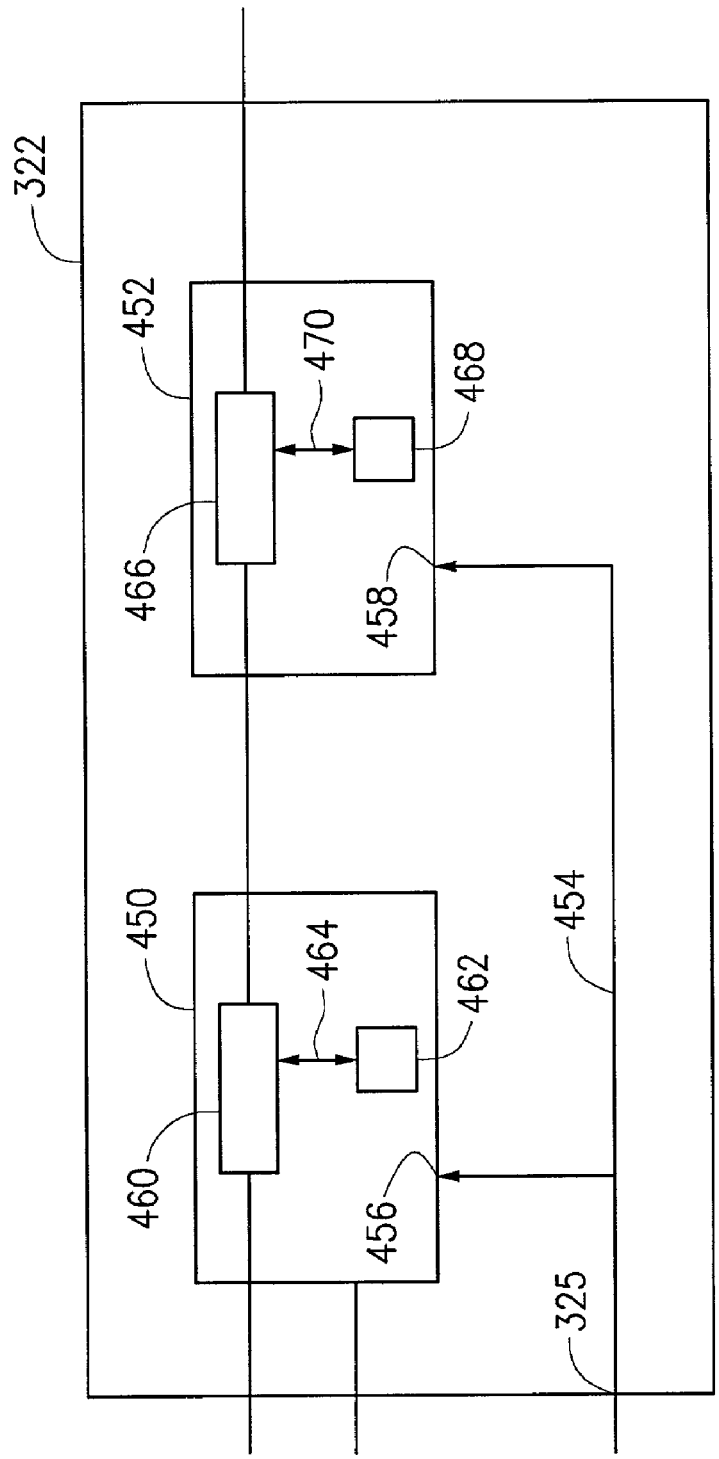
FIG. 5 shows an exemplary data synchronizer circuit in block diagram form according to one aspect of the invention.

FIG. 5 shows an exemplary data synchronizer circuit as in FIG. 4, in additional detail. The data synchronizer circuit (eg. 322) includes a phase alignment circuit 450, and a bit alignment circuit 452. A clock signal received at input 325 of the data synchronizer is coupled by a clock line 454 to a clock input 456 of the phase alignment circuit and a further clock input 458 of the bit alignment circuit.

The phase alignment circuit 450 includes an adjustable delay line 460 and a delay control circuit 462 bidirectionally coupled to the delay line at 464. In an alternate embodiment, a multi-tap delay line is used in place of the adjustable delay line 460. The bit-alignment circuit includes a shift register 466 and a bit control circuit 468 bidirectionally coupled to the shift register at 470.

Figure 6A:
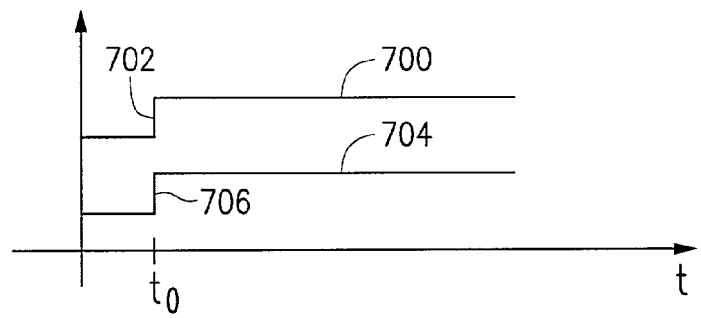
FIGS. 6A-F show data signal timing relationships according to one aspect of the invention.
Figure 6B:
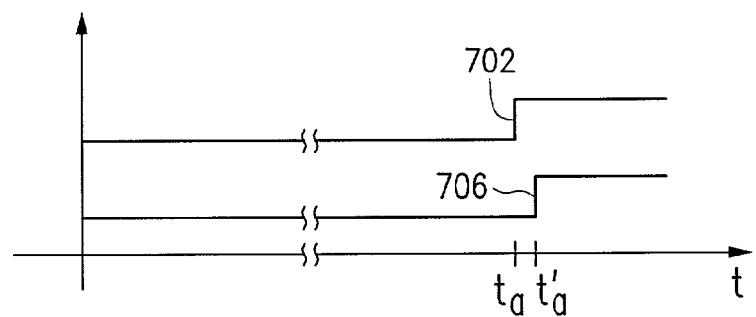

Together, the phase alignment circuit and the bit-alignment circuit act to correct for unequal signal transmission delays exhibited by signals conveyed by, for example, the bit-0 288 and bit-1 290 T-lines. As shown in FIG. 6A, a first signal 700 including a first signal transition 702 is transmitted on the bit-0 T-line 288. A second signal 704 including a second signal transition 706 is transmitted on the bit-1 T-line 290. At the input to a particular media segment, both the bit-0 transition and the bit-1 transition occur simultaneously at time $t_o$. Due to differences in the length and/or electrical characteristics of the bit-0 288 and bit-1 290 T-lines, the two transitions are no longer synchronized when they reach the output end of the media segment. This is shown in FIG. 6B where signal transition 702 arrives at a receiving node at time $t_a$ prior to the arrival of transition 706 at time $t_a$. In practice, such de-synchronization of signal transitions can cause data errors. Accordingly, it is the function of the phase alignment circuit to realign the two signal transitions so as to insure data integrity.

Figure 6C:
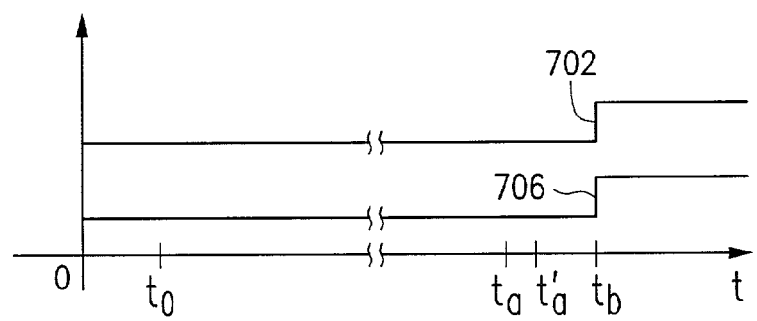

In FIG. 6C, the two signal transitions are shown realigned at time $t_b$, after having passed through the phase alignment circuit. In operation, a calibration cycle is executed during which respective bit-0 and bit-1 signal transitions known to be simultaneously issued are detected. Any media-induced delay is ascertained, and used to set a delay factor imposed by the delay line 460 that is applied to the bus channel with the smallest intrinsic delay (and thus the first-arriving signal). This delay factor remains in effect after the calibration cycle is complete, and acts to delay what would otherwise be early-arriving signal transitions so that a later-arriving signal has a chance to catch up. As would be understood in the art, calibration of the delay line may occur once or repeatedly, according to the stability of the transmission media and the requirements of the particular application.

Figure 6D:
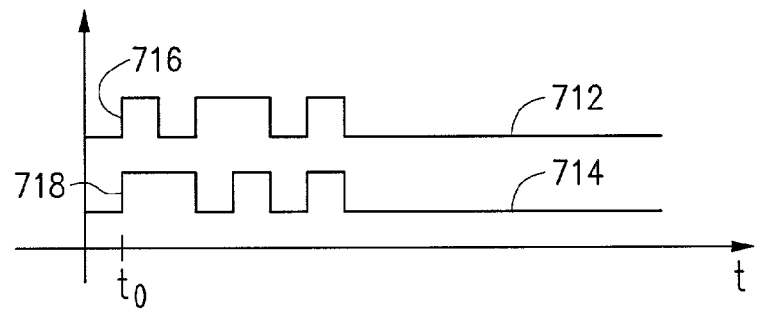
Figure 6E:
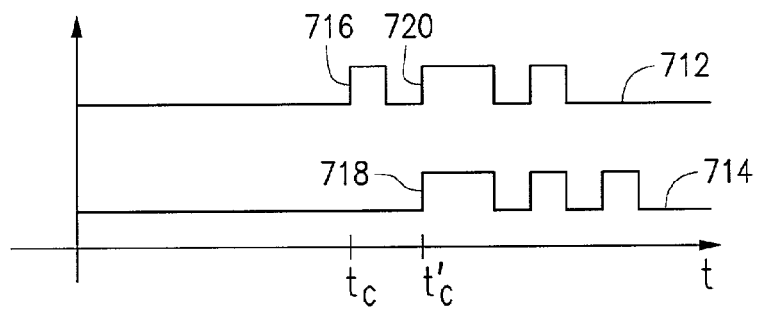
Figure 6F:
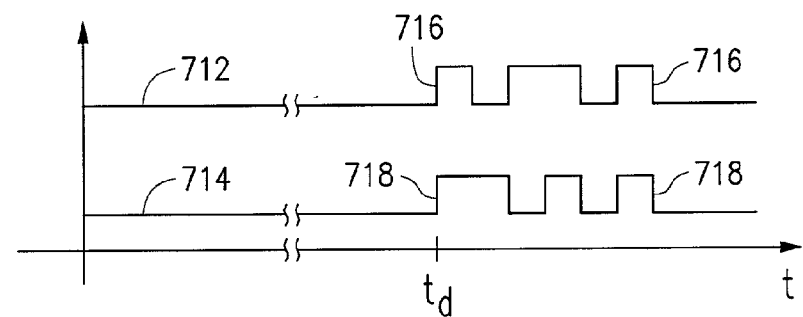

The bit-alignment circuit performs a function similar to that of the phase-alignment circuit, but at a bit/word level. Depending on the characteristics of the respective T-lines and the frequency of data transmission, the phase differential introduced during transmission over a particular media segment may exceed one bit-time. This effect is shown in the bit-0 line and bit-1 line signals shown in FIG. 6D which illustrates two signals (bit-0 712, bit-1 714) with respective first transitions 716, 718 transmitted at time $t_o$. In such a case, as shown in FIG. 6E, simple alignment of signal phase may not properly align the signals as transmitted. In FIG. 6E, one sees that excessive delay in the T-line bearing signal 714 causes transition 718 to arrive at a receiving node at time $t_c'$, well after transition 716 which arrives at the same node at time $t_c$. Consequently, after phase alignment (as described above) transition 718 aligns, incorrectly, with transition 720, rather than transition 716. The evident consequence is a loss of data integrity. Therefore, it is necessary to phase-shift incoming data signals sufficiently so as to insure that corresponding data bits of the bit-0 and bit-1 lines are processed simultaneously. This is achieved by shifting the phase-aligned signals from each T-line into respective shift registers, and tapping signals out of the respective shift register at respective points that eliminate the undesirable misalignment shown in FIG. 6E. FIG. 6F shows the shifted result with data signals both phase-aligned and bit-aligned at time $t_d$.

The operation of the FIG. 1 embodiment of the high speed ring/bus including nodes of the FIG. 4 embodiment will now be described in additional detail.

In general operation, an application circuit 414 of node A generates a message to be sent, for example to a corresponding application circuit 414 of node D. The data comprising the message to be sent is packaged in a packet structure including a header having origin and destination information along with information characterizing the payload of data (for example data length may be included, along with a CRC value that is used to confirm data integrity). The packet is transmitted over the wide, low-speed data bus 430 in words of width R from the application circuit to the FIC circuit 340 of node A. In the FIC circuit, inter-packet data may be added, such as error checking/correcting codes or other data further characterizing the complete packet, or supporting ring operation. Inter-packet data includes data that is added to the data stream passing around the high speed bus that is not part of the payload and headers of a regular packet. This data may be appended by the FIC circuit to a data packet prepared by an application circuit. Alternately, it may be a special packet originating with the FIC, and having a format that is like that of a regular packet, or completely different. In one aspect of the invention, repeated packet origin and destination information is included in this inter-packet data. The packaged data that was received (and optionally processed) by the FIC circuit in words of R bits wide is broken into words N-bits wide where N<R. These N-bit wide words are each allocated to one of a plurality of outgoing bit-streams. In the FIG. 4 embodiment, 2 bit streams are available (bit-1, bit-0). Accordingly, in a typical application according to FIG. 4, the relationship between the widths of lines 430 (R) and 354 (N) would be R=2×N. Proceeding along the bit-0 data path, data is then transferred in N-bit wide words over line 354 to the output FIFO buffer 358 which stores the data it receives as words of width N.

A clock signal is provided by the FIC circuit at its clock output 360, to the output FIFO buffer 358. Under the control of this clock signal, the output FIFO buffer 358 transfers data in N-bit words to the serializer 368. The serializer receives the data in N-bit wide words at a given clock rate and outputs the data at a clock rate N-times faster in a one-bit wide stream. Concurrently, along the bit-1 data path, data is passed out of the FIC circuit 340 in N-bit wide words, buffered in FIFO 396, and serialized into a one-bit wide output signal by serializer 398.

Output amplifiers 374 and 400 each amplify respective one-bit wide data signals and send the signals out over their respective T-lines (288, 290) of a media segment 102 coupled to node A 150 at output port 304. These bit-0 and bit-1 data signals are then received at input port 302 of node B. Specifically the bit-0 data stream is received at input 306 of amplifier 308 and the bit-1 data stream is received at input 310 of amplifier 312. The input amplifiers 308, 312 are designed in routine fashion to have an input impedance matched to the impedance of the respective T-line (288, 290) to which each is respectively coupled. This serves to minimize signal reflection. Also, in the illustrated embodiment, the respective amplifier inputs 306, 310 are implemented as differential inputs, preferably with a high common node rejection ratio (CMRR).

The bit-0 input amplifier 308 supplies an amplified copy of the data signal it receives to the bit-0 data synchronizer 322. Concurrently, the bit-1 input amplifier supplies an amplified bit-1 data signal to the bit-1 data synchronizer 390.

At the same time a clock signal is supplied to the two data synchronizers at their respective clock inputs 325, 326 by the clock divider and synchronization control circuit 329.

As described above in relation to FIG. 5, the data synchronizers 322, 390 perform a phase alignment and a bit alignment on the two data signals. Consequently, at the respective inputs of the respective deserializers 328 and 392, the bit-0 and bit-1 data streams are properly aligned. The two deserializers 328, 392 concurrently demultiplex the two incoming data signals from single bit wide signals into respective N-bit wide data streams.

The N-bit wide data streams are slowed by demultiplexing to a clock rate 1/N times as fast as the clock speed of the data found on the incoming T-line (at port 302). N-bit wide data is passed concurrently from deserializers 328, 392 to input FIFO buffers 332, 394 according to the clock signal provided on clock line 348. Each FIFO buffer, in turn, passes N-bit wide data to the FIC circuit 340 at inputs 338 and 404 for the bit-0 and bit-1 data streams respectively.

The FIC circuit 340 evaluates the incoming data to see whether it is destined for the instant node (here node B). If so, the data is passed to the local application circuit 414. If not, the data is passed through to the respective FIC outputs 352, 406 of the FIC circuit. In one embodiment of the invention, the determination of data destination is made by evaluating inter-packet data. In another embodiment of the invention, destination information from within the packet is evaluated to ascertain packet destination.

In the present example, the data being transmitted is destined for node D rather than node B, therefore tle FIC circuit 340 will pass the data from its inputs 338, 404 to respective outputs 352, 406. However, if upon the arrival of the incoming data at inputs 338, 404, the FIC 340 is already sending data (for example, data that originated with the node B application circuit 414) then, in one aspect of the invention, the incoming data is buffered in the incoming FIFO buffers 332, 394 until transmission of the outgoing data (for a destined portion thereof, e.g., packet) is complete. Note that a portion of the incoming data stream may be buffered in additional registers coupled to FIC inputs 338, 404 within the FIC 340. Data stored within these additional registers may be evaluated for control purposes.

It should be noted that, in one aspect of the invention, a priority scheme is established such that incoming data may be prioritized over outgoing data. This prioritization may be controlled by a convention that always gives priority to incoming data, or alternately, by a comparison within the FIC circuit 340 of priority designation of data contained within the two incoming data streams. Note that the priority data may be contained within a packet, or may be transferred as inter-packet data that is generated by the FIC or the application circuit, depending on the particular application, and may be inserted in a data stream under hardware or software control.

The data output by node B on media segment 104 is received by node C, which performs the same functions detailed above with respect to node B. Again, the data is not destined for node C, and so it is passed through node C and transmitted over media segment 106 to node D. At node D, the input data is received, amplified, synchronized, deserialized, buffered and transferred to the FIC circuit 340. In the FIC circuit, the destination portion of the data stream is examined to ascertain that the current node is the destination node. The N-bit wide data words of the bit-0 data stream are then combined (typically concatenated) with the N-bit wide words of the bit-1 data stream to form, for example, R-bit wide data words that are passed over the local data line 430 to the node D application circuit 414.

Figure 7A:
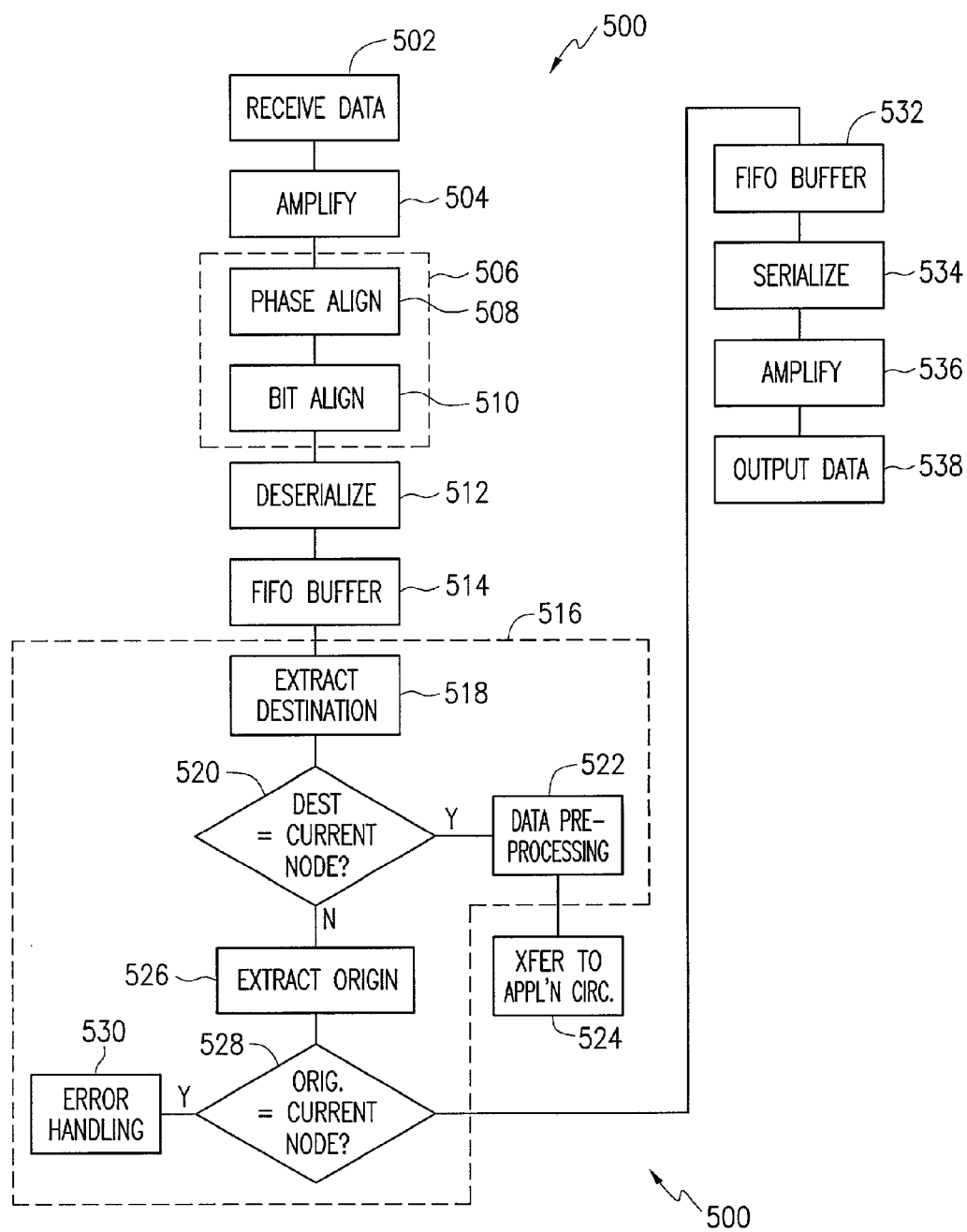
FIG. 7A shows a flow chart summarizing a portion of the operation of an exemplary node according to one aspect of the invention.

The flowchart of FIG. 7 summarizes a portion of the operation of a node with respect to signals received at input port 302, and shows the data processing portion 516 that takes place within the FIC circuit 340, as discussed above. The overall data stream routing process 500 includes receiving data 502 at a node. The data signal is received at a device with an input impedance matched to the media segment to which it is coupled for receiving. The data signal is then amplified 504 in an input amplifier that may have positive, negative, or unity gain as required by a particular application.

In a next step, plural data signals received on respective data paths are synchronized 506. This data synchronization includes phase alignment 508 and bit alignment 510, as previously described. Thereafter, the data signals are deserialized 512 by demultiplexing. This widens and correspondingly slows the data stream. The words of the wide data stream that results are stored 514 in a FIFO buffer. This allows the receipt of an incoming data stream while the FIC is otherwise occupied, e.g., with transmission of outgoing data originating at the present node. After storage in the FIFO buffer, data is evaluated and processed in the FIC at process segment 516. FIC processing includes evaluation of data destination information. The data destination is extracted 518 according to the format of the data. Typically, it is found in a packet header or in inter-packet data. Once extracted from the data stream, destination information is evaluated 520 to determine whether the present data (e.g., data packet) is destined for the current node. If so, any required pre-processing 522 such as removal of inter-packet data, stripping of packet headers, error checking/correction, and/or aggregation of data into wider parallel format, is performed. Thereafter, in one embodiment, data from the data stream is passed 524 over a correspondingly wide and slow data bus to a local user application circuit of the node.

As would be understood by one of skill in the art, one node of a high-speed bus according to the invention may serve as a gateway to one or more application circuits standing alone or configured in a wide variety of communication networks. Such communication networks may include further instances and embodiments of a communication system as described herein.

Referring again to FIG. 7A, in one embodiment of the invention, if the destination extracted 518 from the data stream does not match the current node, the node extracts origin information 526. In a ring structure embodiment of the invention, one possible failure mode is that information is not recognized by a destination node or is otherwise passed all the way around the ring to its originating node. Therefore in one aspect, the present node compares the extracted origin information to its own address 528 to confirm that the data has not inadvertently been passed all the way around the ring network without being accepted by a receiving node. If data is found to have completely traversed the ring, appropriate error handling may be applied 530. In an alternative embodiment, a data packet is always passed completely around the ring, e.g. to confirm ring integrity, while a copy of the data is left behind at the destination node. It should be noted that selection of the particular order in which the various information, such as origin and destination addresses within a data stream, is handled would be a matter of routine design for one of skill in the art. Moreover, the functions presented herein are merely exemplary of the data processing that would be performed to execute the data routing function of the FIC as characterized herein.

In the common case, where data of the data stream neither originated at, nor is destined for, the present node, the data stream is passed out of the FIC and stored 532 in the output FIFO buffer. This data stream may be an exact reproduction of the incoming stream as synchronized (at 506) or it may include network history information added by the FIC related to passage through the present node. The information of the data stream is held in the FIFO until it can be serialized 534 (i.e. multiplexed) into a narrower data stream with a correspondingly higher clock rate. The signal of this narrower data stream is then amplified 536 by an amplifier with an output impedance that is matched to the outgoing media segment and output 538 onto that media segment for transmission to the next sequential node.

Figure 7B:
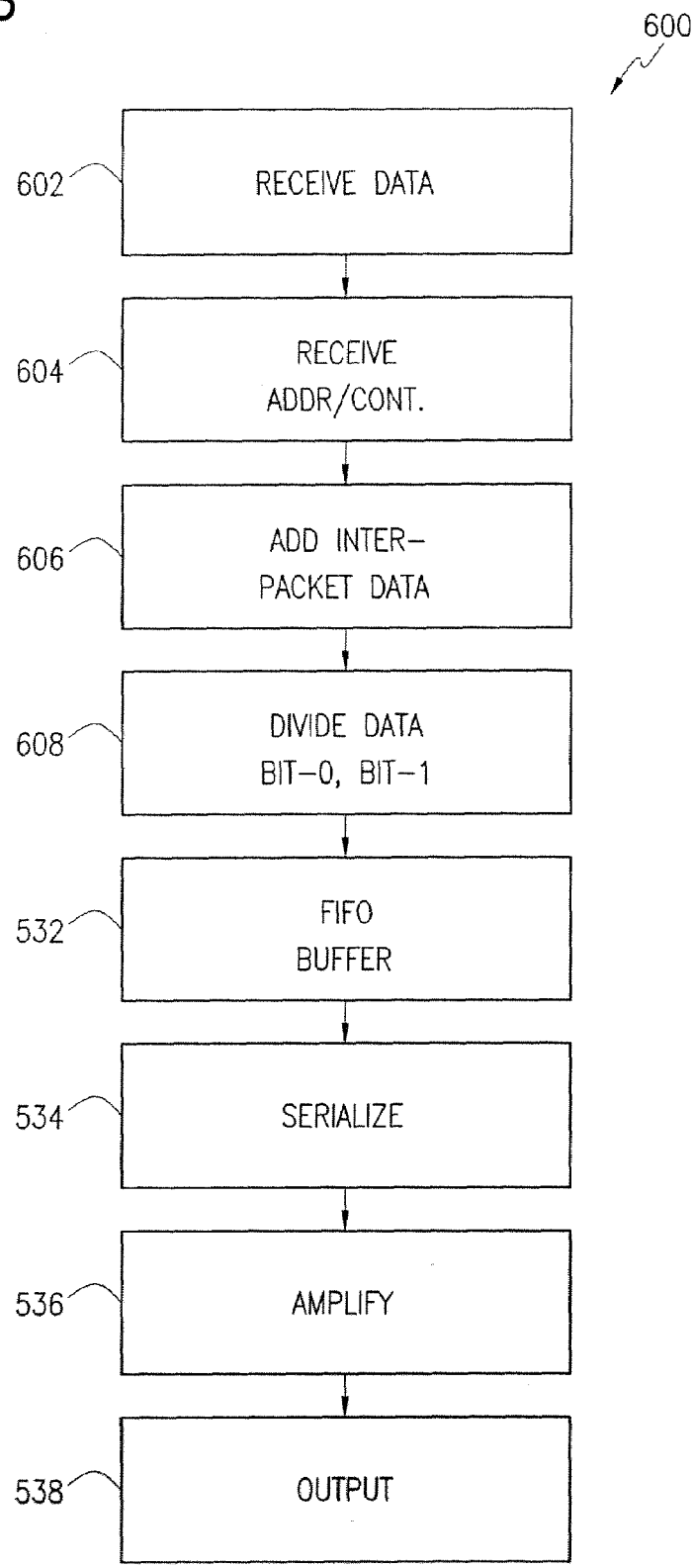
FIG. 7B shows a flow chart summarizing a portion of the operation of an exemplary node according to one aspect of the invention.

FIG. 7B shows a flow chart that summarizes the processing 600 of data originating at the application circuit 414 of a particular node. The data is received 602 (e.g. at input/output 428) of the FIC circuit. Typically, the data received is already configured in a data packet such as that described above in relation to FIG. 2. In addition, address and control data may be received 604 at respective input/outputs 422, 416 of the FIC circuit.

In one embodiment of the invention, the FIC circuit adds interpacket data 606 characterizing the packet (e.g. error checking/correction, transmission timestamp, etc.) to the packet data. The combined data packet and interpacket data form a data stream that is then divided into plural streams 608 according to the number of data bit streams of the media segment (two streams for the FIG. 4 embodiment). Next, the data is transferred 532 to the output FIFO buffer in N bit wide words. Thereafter, the data is serialized 534 in to one-bit wide data streams which are amplified 536 and output 538 onto the media segment connected at output port 304.

At this point, one should recognize that each node (A, B, C, D) controls the media segment (102, 104, 106, 108) connected at its respective output port 304. In one aspect, port 304 is unidirectional (outgoing) and only that node may send data on the media segment. Accordingly, there is no exchange of a control token, and no opportunity for signals to collide on the data bus. The inefficiencies of token ring and collision-based systems are thus avoided.

The system is a peer-to-peer system in the sense that each node is structurally and functionally similar to every other node of the ring. Each is the master of the media segment coupled at its output port 304 and the slave (with respect to receiving data) of the media segment at its input port 302.

Figure 8A:
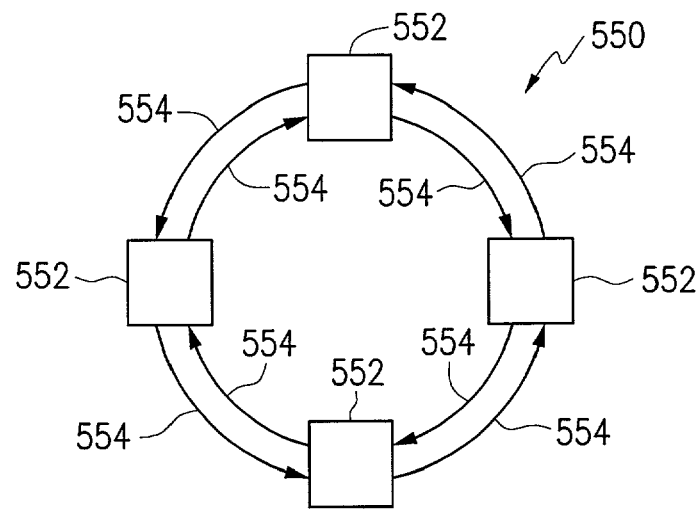
FIG. 8A shows an exemplary embodiment of a communication network according to the invention.
Figure 8B:
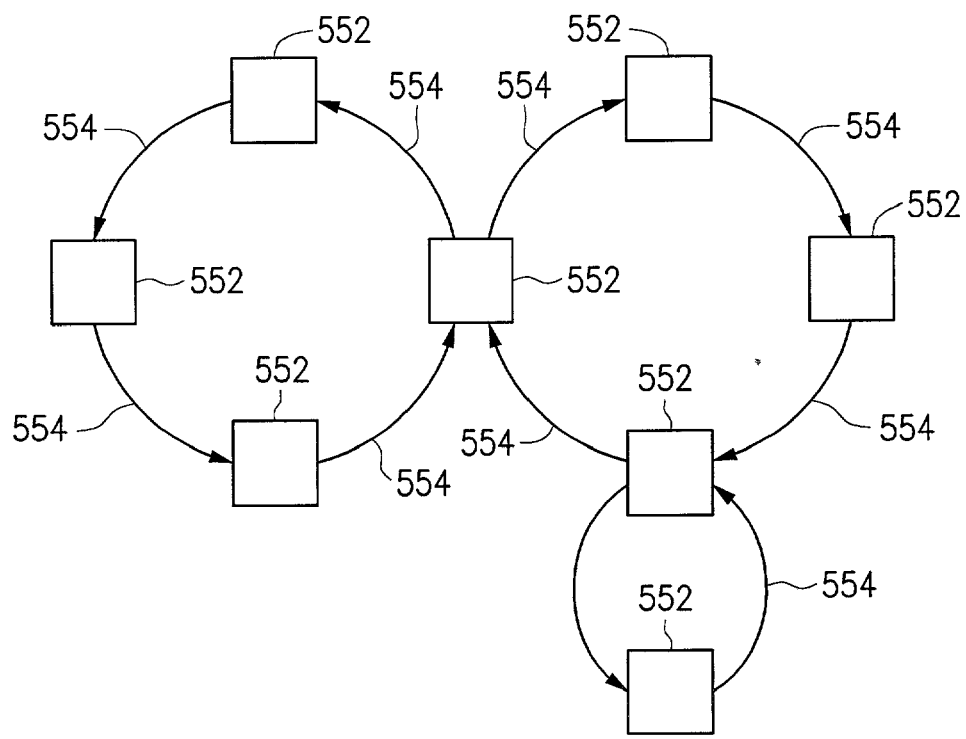
FIG. 8B shows an exemplary embodiment of a communication network according to the invention.

As is readily understood, the ring bus structure illustrated in FIG. 1 is only one of a wide variety of configurations that are routinely derived from the foregoing disclosure according to the requirements of a particular application. In other aspects, as shown in FIG. 8A, the invention includes a network 550 with plural counter directional rings including nodes 552 and media segments 554. Alternately, (for example), multiple linked rings may be configured as shown in FIG. 8B. A ring structure is not, however, required and linear or other configurations may be employed where unidirectional transmission is desired or, where a mechanism for reversing the direction of information flow, as necessary, is provided.

With respect to clocking of the system, while in one aspect the nodes operate as co-equals on a ring, one node may be designated to temporarily or permanently supply a clocking signal for the entire ring. Alternately, generation of the clock signal is a task that may be periodically assumed by different nodes. It is not, however, essential that a single clock signal be utilized by the entire network. Since each node controls its outgoing media segment, different clock signals may be employed on different media segments.

As alluded to above, one application for the high speed bus of the present invention is in the aggregation of a plurality of integrated circuit devices, e.g., memory devices, into a cooperating high speed unit. Thus, for example, multiple CAM devices may be configured to operate in coordinated fashion by communicating with one another according to the present invention. The invention is not so limited, however, and may be employed in a wide variety of data processing systems.

Figure 9:
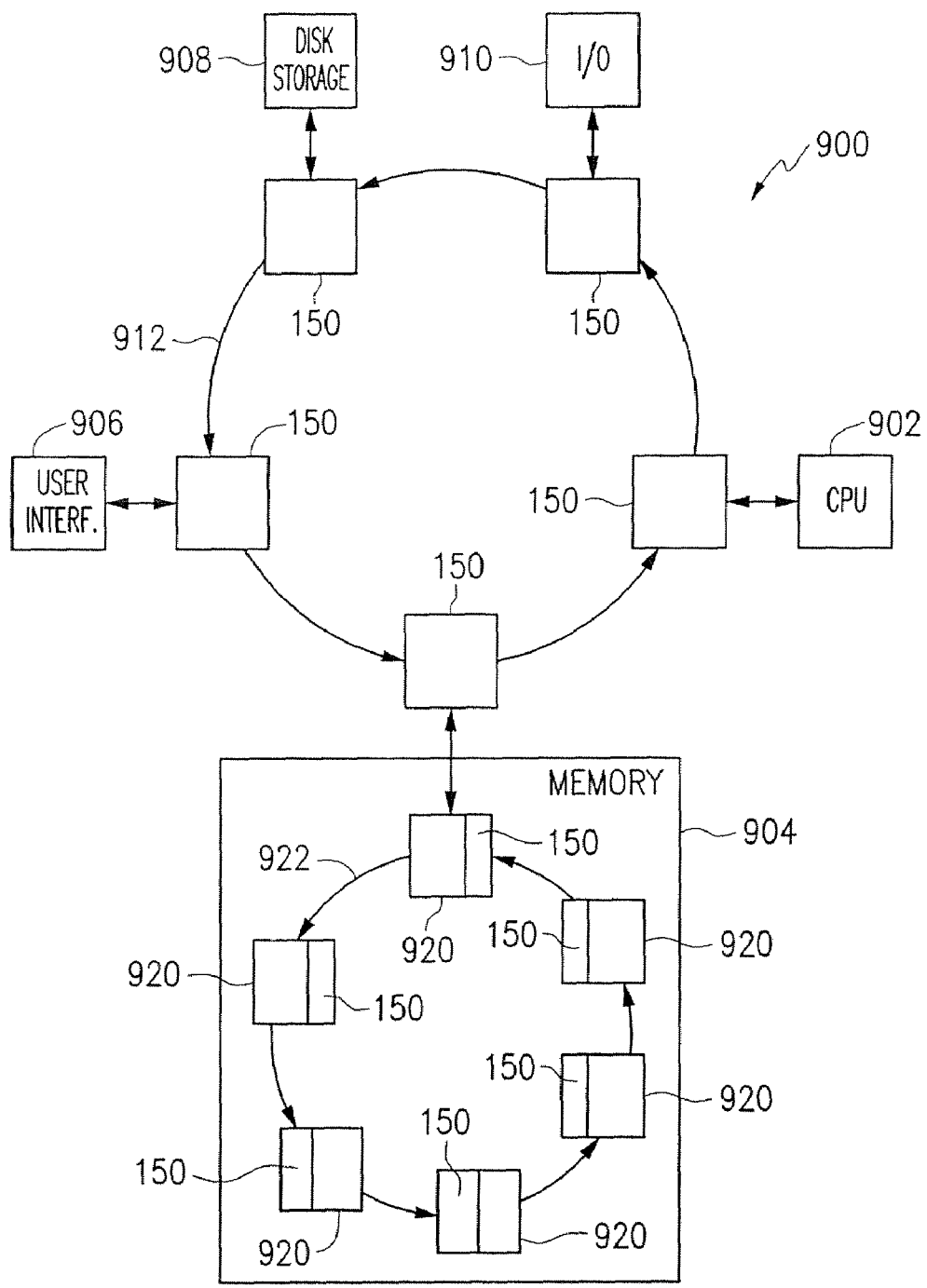
FIG. 9 shows a computer system including a memory prepared according to the invention.

FIG. 9, for example, shows a generalized digital system 900 in which processor, memory, and other components are spatially distributed and connected to one another by a high speed bus according to one aspect of the invention. Accordingly, a central processing unit 902, a memory unit 904, a user interface unit 906, a disk storage unit 908, and an I/O unit 910 are each coupled to the high speed bus 912 by respective nodes 150. Digital data is passed between the nodes according to a protocol routinely adapted from the foregoing disclosure to the requirements of the particular system illustrated.

According to a further aspect of the invention, the memory unit 904 includes a plurality of memory modules 920 (e.g. RAM integrated circuit devices, CAM integrated circuit devices, etc.) mutually coupled by a further high speed data bus 922. The memory modules 920 are each coupled to the further bus 922 by a node 150 which may be discrete from the memory device, or which alternately may be integrated with the memory module 920, as shown.

While preferred embodiments of the invention have been described in the illustrations above, it should be understood that these are exemplary of the invention and are not to be considered as limiting. Additions, deletion, substitution, and other modifications can be made without departing from the spirit or scope of the present invention. Accordingly, the invention is not to be considered as limited by the foregoing description but is only limited by the scope of the appended claims.

What is claimed as new and desired to be protected by Letters Patent of the United States is:

1. A network comprising:
   a first node circuit having a first input port and a first output port;
   a second node circuit connected to said first node circuit via a first media segment; and
   a third node circuit connected to said first node circuit via a second media segment, said first input port to receive a first data signal from the second node circuit via the first media segment, said first media segment to be controlled by said second node circuit during a particular time period, said first output port to transmit a second data signal from said first node circuit to the third node circuit over the second media segment, said second media segment to be controlled by said first node circuit during said particular time period, and said media segments to transmit clock signals in addition to data signals.

2. A network as defined in claim 1 wherein said first and second media segments comprise respective first and second pluralities of waveguide structures.

3. A network as defined in claim 2 wherein said respective first and second pluralities of waveguide structures each comprise an electrical transmission line.

4. A network as defined in claim 2 wherein said respective first and second pluralities of waveguide structures each comprise an optical waveguide.

5. A network as defined in claim 1 further comprising:
   an input buffer adapted to store a first data value related to said first data signal; and
   an output buffer adapted to store a second data value related to said second data signal, said first and second data values being stored in said respective input and output buffers.

6. A network as defined in claim 1 wherein said second node circuit includes a second input port and a second output port and said third node circuit includes a third input port and a third output port, and wherein said third output port is coupled to said second input port by a third media segment.

7. A network as defined in claim 1 wherein said first node circuit further comprises:
   a local port; and
   a Formatter, Interface, and Control (FIC) circuit adapted to switchingly route a data value derived from said first data signal to a local application circuit coupled to said local port.

8. A network as defined in claim 1 wherein said first node circuit further comprises;
   a local port; and
   a Formatter, Interface, and Control (FIC) circuit adapted to receive a data value from a local application circuit coupled to said local port and to switchingly route said data value said first output port.

9. A network as defined in claim 8 wherein said data value comprises:
   header data including address data and payload data.

10. A method of communicating digital data comprising:
    during a first time period, concurrently receiving first and second digital signals at a first network node on respective first and second serial data lines and a first clock signal over a first clock signal line;
    de-multiplexing said first and second digital signals into respective third and fourth digital signals;
    buffering a transient data set corresponding to said third and fourth digital signals;
    evaluating a portion of said transient data set to ascertain data origin and destination values;
    retaining said transient data set or multiplexing said transient data set to form third and fourth digital signals according to said origin and destination values; and
    concurrently transmitting said third and fourth digital signals to a second network node on respective third and fourth serial data lines and a second clock signal over a second clock signal line during a second time period.

11. A method of operating a communication bus comprising:
    coupling a plurality of nodes in a circular configuration; and
    simultaneously receiving a first message packet transmitted from a first node of said plurality at a second node of said plurality while transmitting a second message packet from said second node to a third node of said plurality, wherein data in said first message packet is different from data in said second message packet and wherein each packet includes a clock signal encoded therein.

* * * * *